Aug. 7, 1951          M. COWAN          2,562,892

MEANS AND METHODS FOR CUTTING FABRICS

Filed Dec. 22, 1945          3 Sheets-Sheet 1

INVENTOR
Morris Cowan
BY
Dean Fairbank & Hirsch
ATTORNEYS

Aug. 7, 1951  M. COWAN  2,562,892
MEANS AND METHODS FOR CUTTING FABRICS
Filed Dec. 22, 1945  3 Sheets-Sheet 2
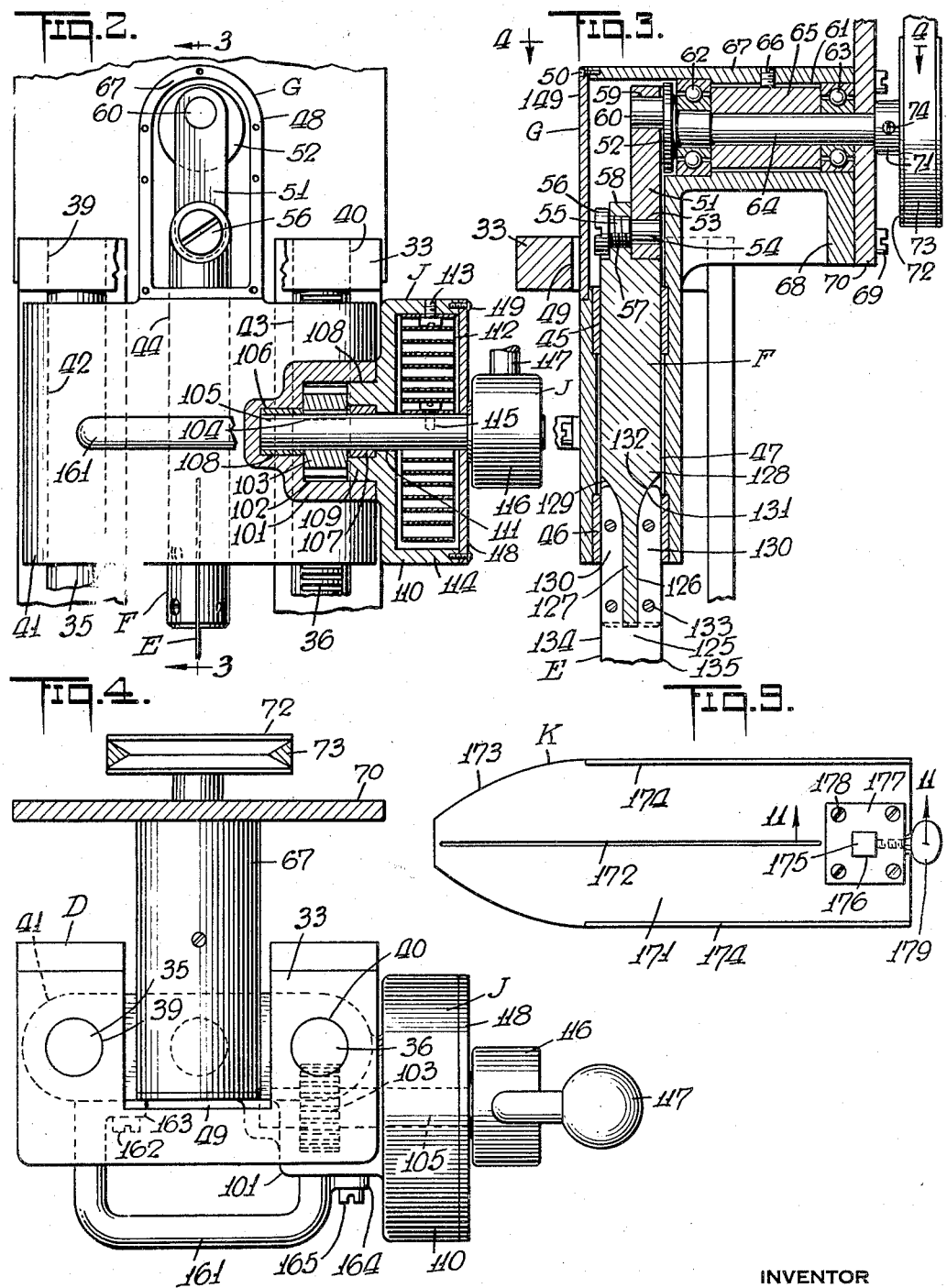
INVENTOR
Morris Cowan
BY
Dean Fairbank & Hirsch
ATTORNEYS

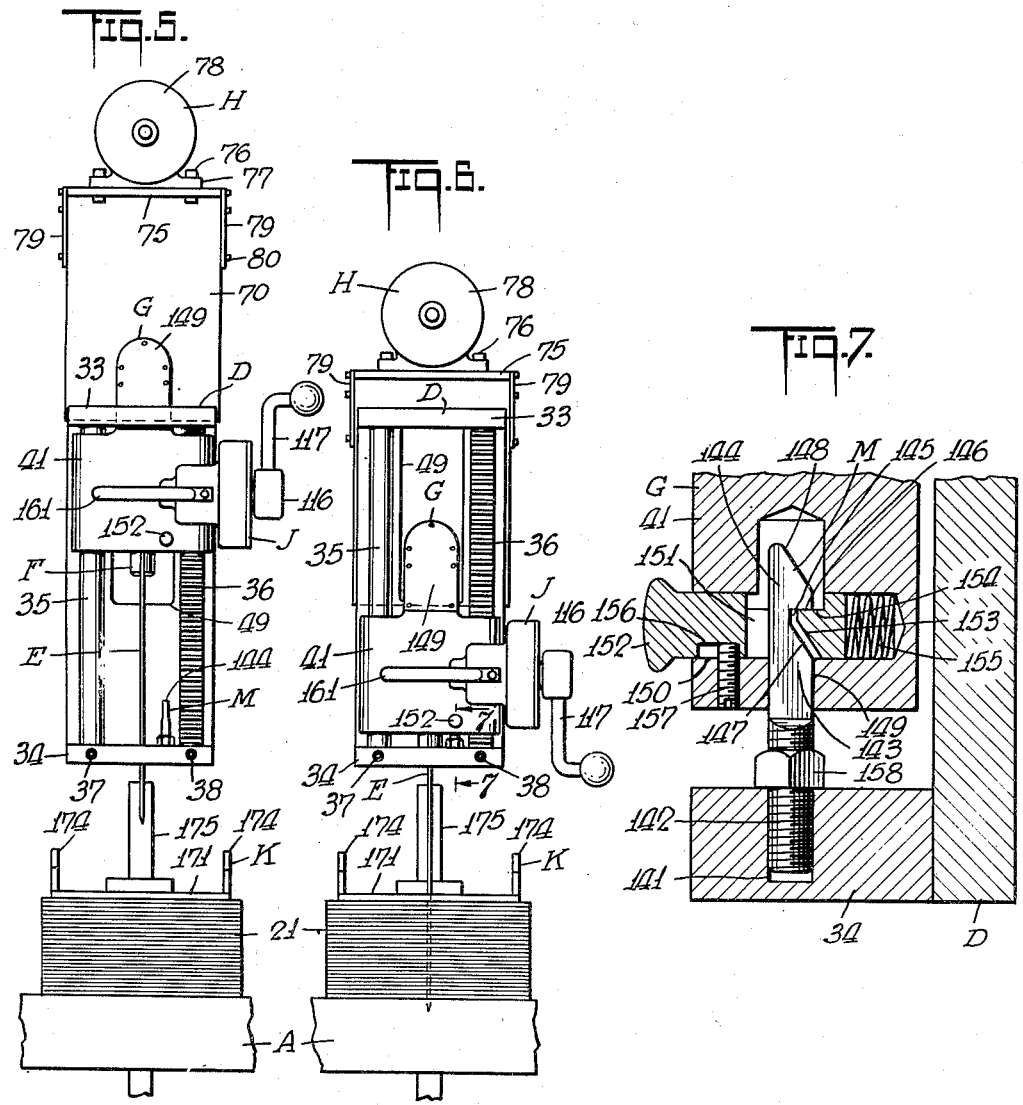

Patented Aug. 7, 1951

2,562,892

UNITED STATES PATENT OFFICE 2,562,892

MEANS AND METHOD FOR CUTTING FABRICS

Morris Cowan, New York, N. Y.

Application December 22, 1945, Serial No. 637,064

14 Claims. (Cl. 164—75)

1

The present invention relates to methods and mechanisms for cutting fabrics and it particularly relates to cutting or incising internal openings in fabrics.

Although the present invention will be particularly described in its application to cutting textile or clothing fabrics, and particularly closed slots or slits or internal openings therein, it is to be understood that it has a broader application to cutting internal windows or openings of any desired form or shape in leather, leatherette, canvas or other sheet materials.

In present methods of fabric cutting in the textile industries and the clothing trades, the fabric to be cut for sewing into a garment is spread or laid upon a long table in piles as high as 8" in height, the number of layers depending upon the thickness of cloth. Then the patterns are laid upon it and the outlines marked with cloth marking chalk. Finally a cutter upon a base having rollers resting upon the table and with an electric motor drive is pushed by hand through the spread with the hand of the operator guiding the cutter in following the chalk marked outlines of the pattern.

It is not possible by the foregoing cutting procedure to make internal openings and slits for pockets or to permit gathering of the cloth for form fitting or to allow inserts or quirks to be inserted for extra fullness.

To accomplish the latter it was customary to remove the sections of the cut multi-layer spread which are to receive internal cuts and these internal cuts were then made by hand with a shrap knife and a cowhide mallet.

This manual method of cutting results in considerable unevenness in the cut in various layers due to ruffling and displacement and in some instances quite a number of the pieces of the fabric were damaged and could not be properly fitted into the final garment.

In another method a long needle was pierced through the ends of the internal cut as marked in chalk upon the top layer of the portion of the spread, and then a cord was left extending on each side through the ends of the slit or slot. Finally a hand operator would cut each layer individually between the cords.

These methods, however, were all laborious and labor consuming, and were not reliable since the fabrics were often damaged. Moreover they slowed up the entire fabric cutting and garment manufacturing operation causing the cloth to be held in the hands of the cutter for too long a time.

2

It is among the objects of the present invention to provide a fabric or cloth cutting method for making internal cuts in textile and clothing fabrics of various shapes and characters with a minimum of manual labor and with assurance that the pre-determined position of the cut shall not be varied from piece to piece even though a pattern-cut pile of fabrics be operated upon at one time.

Another object is to provide a self-contained complete cloth cutting unit particularly designed for making internal cuts in textile or clothing fabrics which is of inexpensive and light construction and which may be operated to cut a pile of fabrics quickly and uniformly with assurance that the cut throughout the pile will be uniform from piece to piece.

Still further objects and advantages will appear in the more detailed description set forth below, it being understood, however, that this more detailed description is given by way of illustration only and not by way of limitation since various changes therein may be made by those skilled in the art without departing from the scope and spirit of the present invention.

A principal feature of the present invention resides in the provision of a self-contained unit for making internal cuts in fabrics provided with a motor driven knife which may be manually lowered to cut down and through a pile of fabrics and then moved transversely to cut a slit of desired length therein.

The knife in a preferred embodiment is provided with forward and rear cutting edges and a sharpened bevelled lower end to enter into the pile of fabrics.

Another feature resides in compressing and clamping the fabrics down upon a table forming part of the unit, by a presser foot operated by a treadle along the entire cut and upon both sides thereof.

Other features will be apparent from the following description and accompanying drawings.

In the accompanying drawings in which are shown one or more of the various possible embodiments of the several features of the invention;

Fig. 2 is a fragmentary front elevational view upon the line 2—2 of Fig. 1, upon an enlarged scale as compared to Fig. 1 with the front plate of the eccentric drive for the reciprocating knife removed and with the knife lowering and return mechanism shown partly in section;

Fig. 3 is a transverse vertical sectional view upon the line 3—3 of Fig. 2;

Fig. 4 is a top plan view along the line 4—4 of Fig. 3;

Fig. 5 is a front elevational view upon the line 5—5 of Fig. 1 with the knife elevated;

Fig. 6 is a front elevational view similar to Fig. 5, showing the knife in lowered position;

Fig. 7 is a detailed side sectional view upon the line 7—7 of Fig. 6, upon an enlarged scale, showing the trip and lock mechanism for holding the knife down and also showing the release button therefor;

Fig. 8 is a transverse sectional view upon the line 8—8 of Fig. 1, upon an enlarged scale showing the clamp for the carrier ram to hold the same in fixed position during lowering and raising of the knife.

Fig. 9 is a top view of the presser foot upon the line 9—9 of Fig. 1 and upon an enlarged scale as compared to Fig. 1;

Figure 1:
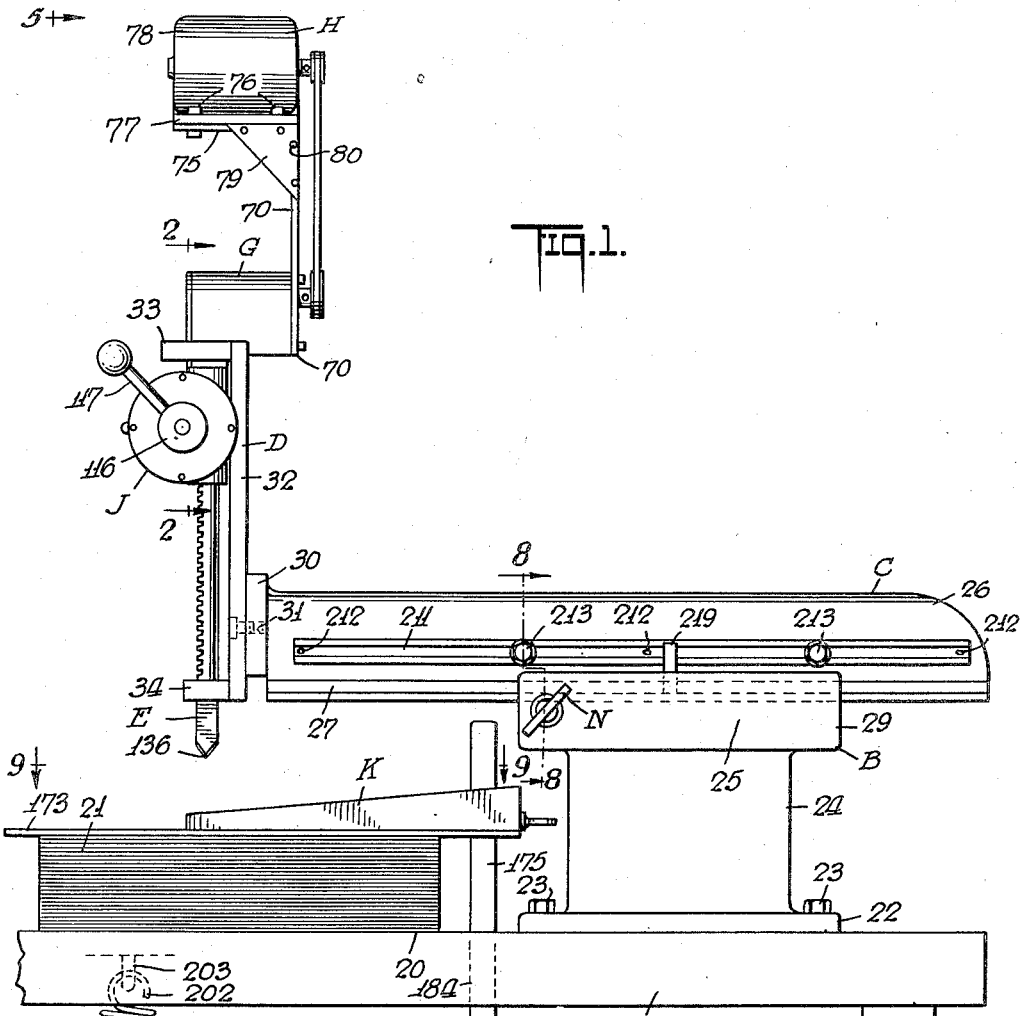
Fig. 1 is a side elevational view of the incisor machine of the present invention with the structure below the table only partly shown, with a pile of fabrics compressed by the presser foot on the table and with reciprocatory knife elevated above the table.

Referring to Fig. 1, the fabric cutting or incisor machine is composed of a table or stand A which supports a base or cradle B. The base or cradle B carries and forms a bearing for the slide or carrier ram C. The forward end of the ram has a U-shaped frame D upon which is mounted the knife E, the reciprocating ram or knife carrier F (see Fig. 3), the head G and the motor H, as well as the knife raising and lowering mechanism J. The presser foot K is actuated by the presser treadle L.

In Fig. 7 is shown trip and lock mechanism M for holding the knife in lowered position. In Fig. 8 is shown the carrier ram lock N for holding the ram in fixed position while the knife E and the head G are being lowered.

The table A as shown in Fig. 1 has a top portion 20 which may be made of steel or aluminum and which may be flanged for rigidity. The top 20 receives the pile of fabrics 21. The pile 21 is usually of 8 inches in thickness and contains a sufficient number of layers of fabric to compose said 8 inches thickness. Of course single layers of fabric or much lower piles could be readily cut or incised. The table top 20 may be supported upon a suitable number of legs 21 (one being shown).

The base B is positioned at the rear of the table and its base plate 22 is held in position by the bolts 23. The cradle or base B has the upstanding structure member 24 and at its upper or top portion it is provided with the fixed bearing structure 25, see particularly Fig. 8.

Referring to Figs. 1 and 8, the carrier ram C has a crown portion 26 with outstanding lower angle portions 27, which bear against overlapping lip portions 28 extending upwardly and inwardly from the sides 29 of the top of the cradle B.

The forward part of the carrier ram (see Fig. 1) is flanged as indicated at 30 and to it is bolted at 31 the U-shaped frame structure D. This U-shaped frame structure is provided with a base or vertical member 32, a top leg or bridge 33 and a bottom leg 34.

Between the legs 33 and 34 (see Figs. 1, 5 and 6) extend the guide rod 35 as well as the rack rod 36, said guide rod and rack rod being held in position by the lock screws 37 and 38. The bridge 33 is provided with openings as indicated in 39 and 40 in Fig. 2 to receive the ends of the guide rod 35 and the rack rod 36. Moving upwardly and downwardly upon the guide rod 35 and rack rod 36 is the reciprocating head G as shown in Figs. 2, 3 and 4. The reciprocating head G has a relatively wide base main structure 41 with openings 42 and 43 which receive the guide rod 35 and the rack rod 36, and it is also provided with a central opening 44 having oilless bushings 45 and 46 serving as bearings for the shank 47 of the reciprocating ram F. The main structure 41 has a reduced width upward extension casing 48 which is received in the opening 49 in the bridge 33 when the head is in its uppermost position. The front of the extension 48 is open and may be covered by a front plate 149 held in position by the screws 50.

The extension casing 48 of the head D receives the link 51 as well as the crank or eccentric 52. As shown best in Fig. 3, the lower end of the link 51 has an opening 53 which receives the stud 54. The stud 54 constitutes a reduced diameter extension of the threaded portion 55 of the screw 56. The screw 56 is screwed into the tapped opening 57 of the extension 58 of the shank 47 of the reciprocating ram or knife shaft or carrier F.

The upper portion of the link 51 is provided with the opening 59 which receives the stud 60 projecting outwardly from the crank or eccentric 52. The head G is provided with the longitudinal opening 61 which receives the forward ball bearing 62 and the rear ball bearing 63 for the crank shaft 64 which is enclosed by sleeve 65 fixed in position by a set screw 66 in the structural enclosure 67. The rear portion of the head G (see Fig. 3) is flanged as indicated at 68, and bolted onto said head by the bolts 69, is the structural plate 70.

The shaft 64 extends beyond the plate 70 and carries the hub 71 of the pulley drive 72, which is V-shaped and is driven by a correspondingly V-shaped belt 73. The hub is held in position by the set screw 74 on the extension of the shaft 64.

The structural plate 70 as best shown in Figs. 1 and 5 extends upwardly to carry the base support plate 75, upon which is attached by the bolts 76 the base 77 of the body 78 of the electric motor H. The brackets 79, provided with the bolts 80, reinforce the connection between the structural plate 70 and the base plate 75.

It will be noted that the brackets 79 (see Fig. 6) are more widely spaced than the side of upper flange or bridge 33 of the bracket D so that they may embrace or enclose the same in lowered position of Fig. 6. The head G as best shown in Figs. 2 and 4 is also provided with a forwardly extending boss 101 which has a central opening 102 receiving the pinion 103.

The pinion 103 is keyed at 104 to the shaft 105 which has oilless bushing bearings 106 and 107. The bearing 106 fits in the opening 108 in the boss 101. Fitting into the outer end of the opening 102 in the boss 101 is the projection 109 of the casing 110 which carries the oilless bushing 107 for the shaft 105 and has an opening 111 through which the shaft 105 projects.

The casing 110 receives the return or elevating coiled leaf spring 112. This spring 112 is fixed at one end by the screw 113 to the outer wall 114 of the casing 110 and is fixed at the other end by screw 115 to a part attached to the shaft 105.

The casing 110 is closed by the plate 118 held in position by the screws 119.

The outer end of the shaft 105 carries the hub 116 of the handle 117. The handle 117 permits the head G and the knife E to be lowered and the spring to be tensioned or stressed.

The boss 101 has an opening (not shown) into the recess 43 of the portion 41 of the head so that the pinion 103 may mesh with the rack rod 36. The pinion 103 remains in mesh with the rack rod as the head D travels up and down upon the guide rod 35 and the rack rod 36 between the upper position shown as in Fig. 5 and the lower position shown in Fig. 6.

The connection of the knife E to the knife haft F is best shown in Fig. 3. The top 125 of the knife E is provided with a central slot 126, into which projects the bridge 127 formed by recessing the lower end 128 of the knife haft F as indicated at 129.

The upper ends of the divided portions 130 of the knife are curved as indicated at 131 to abut and be wedged against the correspondingly curved portions 132 of the recesses 129 in the lower end 128 of the haft F. The bolts 133 extend through the divided portions 130 of the upper end 125 of the knife E and through the lower slotted end of the haft F recessed as indicated at 129.

The knife E as shown is a straight knife with a forward sharpened edge 134 and a rearward sharpened edge 135 so that it can cut on either side and it also has a sharpened bevelled point 136 (see Fig. 1) to enable readier penetration of the fabric pile 21.

When the head D with the knife E is lowered into position to contact and cut the cloth or fabric it is locked into said lower position by means of the mechanism shown in Fig. 7 and also on a smaller scale in Figs. 5 and 6.

As indicated in Fig. 7, the lower flange 34 of the U bracket carrier is provided with a threaded opening 141 which receives the threaded shank 142 of an upstanding notched latch member 143. The portion 144 of the member 143 is notched at 145 and is flattened at its sides as best shown in Fig. 5. It will be noted that the notch 145 has a transverse shoulder 146 and an oblique shoulder 147 and that the upper end of the portion 144 is also provided with an oblique or cam face 148.

The lower side of the wide portion 41 of the head G is provided with a vertical opening 149 and a transverse opening 150. The vertical opening 149 has the same diameter as the diameter of the projection 144 closely to fit the same when the head G is lowered to its bottom position as shown in Figs. 6 and 7. When this occurs the upper bevelled portion 148 of the member 144 will project through the opening 151 in the release button 152 which is fitted into the transverse opening 150.

The rear of the opening 151 of the button 152 is provided with a sloping face 153 to contact the bevel 148 of the member 144 and is also provided with a transverse upper notch 154 to engage the transverse face 146 of the notch 145. The coil spring 155 in the inside end of the opening 150 will press the shoulders 154 and 146 into engagement.

By pressing the button 152 inwardly and releasing the spring 155, it will be possible to disengage the shoulders 154 and 146 releasing the member 144. The amount of movement of the release button 152 is controlled by the longitudinal notch 156 in which is received the end of the screw 157 screwed into the lower portion of the member 41.

The height of the member 144 may be regulated by loosening the lock nut 158 and screwing the member 142 further into or out of the tapped opening 141.

To move the carrier ram C, the handle 161 is attached to the front of the head G (see Figs. 2 and 4) by the screw 162 extending through the inturned flange portion 163 and the screw 165 extending through the outturned portion 164.

The presser foot shown in top view in Fig. 9 and also in smaller scale in Figs. 1, 5 and 6 holds down the pile of fabrics 21 under substantial compression over the entire length of the cut or slit and during the entire operation of cutting or slitting.

The presser foot K is provided with a main base plate 171 having the central slot which is designed to fit over and show the marked line on the top layer of the pile of fabrics 21. This slot 172 may closely bear against the sides of the knife E but preferably is slightly spaced so that there will be a clearance of $\frac{1}{16}$ to $\frac{1}{8}$ inch on each side of the knife.

The base plate 171 of the presser foot K is of decreased width at its forward end 173 and at its parallel sides it is provided with stiffening flanges 174 which increase in height towards the vertical support member 175.

The square cross section support member 175 (see Fig. 9) extends through the square opening 176 in the boss 177 which is held down by the screws 178 upon the base 171 of the presser foot K.

Figures 10, 11:
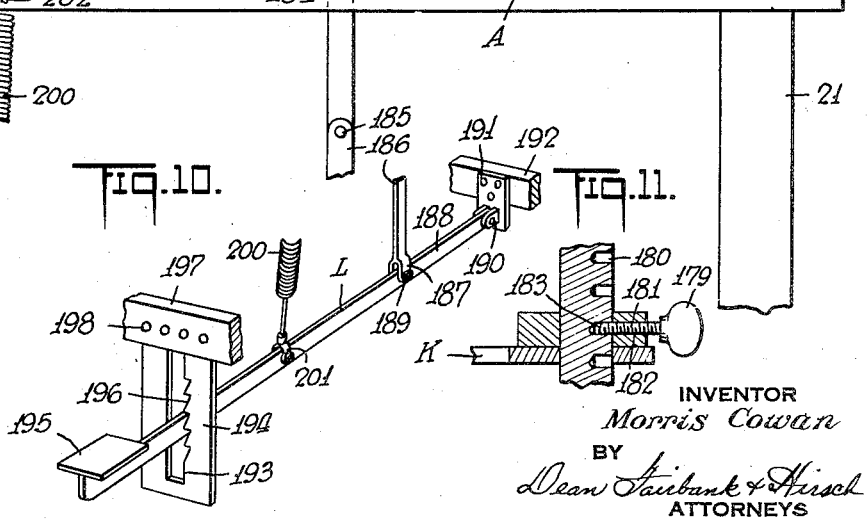
Fig. 10 is a fragmentary perspective view showing the operating means for the presser foot.
Fig. 11 is a detail fragmentary cross sectional view upon the line 11—11 of Fig. 9 showing the construction of the height adjustment for the presser foot.

The wing nut 179 as shown in Fig. 11 permits an adjustment of the presser foot K on the support bar 175. The rear face of the bar 175 is provided with adjustment openings 180 consisting of drilled holes.

The wing nut 179 has a threaded shank 181 fitting through the threaded opening 182 in the boss 177 and the nose 183 is designed to engage the adjustment notch or drilled hole to fix the desired position of the presser foot K.

The lower end of the vertical support 175, as shown in Figs. 1 and 10 extends through the opening 184 in the table top 20 and is pivotally connected at 185 to the link 186.

The link 186 (see Fig. 10) extends downwardly and embraces at 187 the cross bar or lever 188 with the pin 189 forming a means of pivotal connection. The cross bar 188 is pivotally mounted in the U-bracket 190 upon the plate 191. The plate 191 is bolted upon the structural member 192. The forward end of the bar 188 extends through the slot 193 in the plate 194. The bar 188 is provided with a presser treadle 195.

The presser treadle 195 is designed to lower the bar or lever 188 and to engage it in one of the notches 196 in the side of the slot 193. The plate 194 is attached to the cross bar 197 by the bolts 198.

The bar 188 is biased upwardly by the spring 200 which at its lower end is connected to the U-member 201. The U-member 201 is pivotally connected to the bar 188. The spring 200 at its upper end is connected by the hook 202 to the eye 203 in the bottom of the table top 20.

The slide member or carrier ram C is provided with a sheet metal channel 211 on the side thereof held in position by the screws 212. The channel 211 carries the adjustable stops 213.

As best shown in Fig. 8 the adjustable stops 213 are provided with discs 214 fitting in the channel 211 which have threaded shanks 215 receiving the washer 216 and the nut 217. By means of loosening and tightening of the nuts 217, the stops 213 may be placed at any desired position on the channel 211 on the side of the carrier C. The fixed stop 219 (see Fig. 1) will cooperate with the adjustable stop 213 to limit the forward and rearward movement of the knife E.

When the head G is being lowered to lower the knife E to and through the slot 172 of the presser foot K and to and through the pile of fabrics 21, the carrier C may be fixed by the clamp N. The clamp N consists of the handle 225 (see Figs 1 and 8) which is fixed at 226 to the shaft 227. The shaft 227 passes through the opening 228 in the clamping block 229. The inside upper edge of the clamping block 229 is provided with a recess 230 to engage the lower outside edge 27 of the slide C. The shaft 227 extends under the slide C in the recess 231 and has a threaded end 232 which fits into the threaded opening 233 in the other clamping block 234. The clamping block 234 is also provided with a notch or recess 230 to receive the lower outside edge 27 of the carrier slide or ram C.

By tightening the handle 225, the ram on carrier C may be fixed against movement upon lowering the knife E.

In operation the pile of fabric 21 usually consists of layers of dress or clothing textile fabrics up to 8 inches in height, which have already been spread and cut to pattern on a long cutting table. The pile as shown in Fig. 1 has been marked with an internal slit or slot to be cut therein, as for example a pocket or to permit of gathering or fullness as the case may be.

The pile 21 is then laid upon the table 20 under the presser foot K which is in upper position with the lever or bar 188 unlatched from the notches 196. The pile 21 is positioned, so that the portion thereon marked to be cut, is placed with the chalk mark exposed under the slot 172 of the presser foot K. Then the presser treadle 195 is pressed down to bring the presser foot K against the pile of fabrics 21. This will be done against the spring 200 with the bar 188 being latched in a suitable notch 196. Adjustment of the position of the presser foot K may be made by the wing nut 179. During these operations the head G and the knife E are in an elevated position with the knife centrally over the slot 172 and with the carrier ram C clamped in position by the clamp N.

Then the motor H is started, rapidly reciprocating the knife E through the crank 52. The handle 117 is turned lowering the knife E to the slot 172 and to the fabric 21 until the knife E penetrates through the pile of fabrics into the position as shown in Fig. 6 and until the latch engages as shown in Fig. 7 holding the head G in its lower position.

The adjustable stops 213 may at this time or later be adjusted in respect to the fixed stop 219 to permit the carrier ram to move the full length of the slip or slot to be cut in the pile 21.

Then the clamp N is loosened, and by the handle 161 the carrier ram C is moved forwardly and backwardly with the knife penetrating the pile as shown in Fig. 6 to cut the desired internal slit in the fabrics. When this operation has been completed, the knife E may be moved to the middle position of the cut and the carrier ram C may be clamped by the clamp N. Then by pressing the release button 152, the stressed spring 112 will elevate the carrier G and the knife E and the motor H may be stopped.

Then the fabric pile 21 may be released by disengaging the bar 188 and the notches 196, the presser treadle 195 being returned by the spring 200 to its uppermost position.

It is thus apparent that the applicant has provided a simple unitary and novel cloth cutting or slitting machine particularly designed to make internal cuts or slits in piles of fabric with assurance that the cut will be uniform throughout without the need of using a mallet and a sharp knife and without the need of separately cutting each layer of fabric.

Although the present machine is particularly designed for cutting internally, it may also be used for a normal type of cutting piles of fabrics where the fabrics may not be spread upon a long table and where the cutting is primarily along straight lines. By shifting the pile under the knife E and presser K, various outlines of internal openings may be cut.

The speed with which the reciprocatory knife E is lowered into the fabric and the pressure and speed of cutting by moving the carrier forwardly or backwardly is regulated so as to avoid unravelling and generally a light pressure is preferred.

As a general rule, it has been found that the $\frac{1}{2}$ inch reciprocatory movement of the knife E is sufficient and that the knife may satisfactorily have a rate of 2500 reciprocations with a $\frac{1}{8}$ to $\frac{1}{4}$ horsepower motor.

The parts as shown may be made of cast iron or steel with any parts susceptible of being made of aluminum, constructed of this material for lightness. For example, whereas the cradle B and the carrier C may be made of cast iron the frame D and the head G as well as the reciprocating haft F may be made of aluminum.

The spring 112 may be made of various sizes and dimensions but in one construction preferred, it has been found satisfactory to make this spring about 25 feet long, 1 inch wide and of 0.02 inch in thickness of tempered steel.

Although the slot 172 in the presser foot may be made sufficiently narrow to bear against the sides of the knife E, it is desirably of sufficient width to permit the operator to see the chalk marking on the top layer of the pile 21.

The mechanism presented in this invention will cut an absolutely straight line, uniform in each layer of the pile, within 0.05" accuracy and at lengths varying from 1 to 20 inches.

The presser foot K will hold the cloth down during the cutting, firmly compressing it and preventing rising, offsetting and bulging.

Instead of a reciprocating head carrying the drive motor and knife carrier arrangement, the motor might be mounted upon a fixed frame and drive a splined shaft. Upon this splined shaft, the knife carrier could be reciprocated upwardly and downwardly. The carrier could slide in a dovetail bearing member, one side of which could be screwed onto a base and therefore be adjustable to take up wear.

Pneumatic operation to lower the presser head and move the cradle backwardly and forwardly may be used as may also electromagnetic means be used to reciprocate head with spring return.

As many changes could be made in the above cloth cutting mechanism or incisor and many apparently widely different embodiments could be made without departing from the scope of the claims, it is intended that all matter contained in the above description, or shown in the accompanying drawings, shall be interpreted as illustrative and not in a limiting sense.

What is claimed is:

1. A cloth cutting mechanism, comprising a table, a cradle mounted on said table, a carrier ram mounted to slide upon the cradle, a U-shaped bracket at the forward end of said carrier, a vertically reciprocatory arrangement carried by said bracket, said arrangement including a reciprocating head carrying a drive motor, a reciprocating knife haft, a bearing sleeve for said haft, an eccentric drive connection between said motor and said reciprocating haft, a vertical knife carried by said reciprocating ram and means to lower and raise said reciprocating head and said knife together.

2. A cloth cutting mechanism, comprising a table, a cradle mounted on said table, a carrier ram mounted to slide upon said cradle, a U-shaped bracket at the forward end of said carrier, a vertically reciprocatory arrangement carried by said bracket, said arrangement including a reciprocating head carrying a drive motor, a reciprocating ram, a bearing sleeve for said ram, an eccentric drive connection between said motor and said reciprocating ram, a vertical knife carried by said reciprocating ram and means to lower and raise said reciprocating head and said knife together, and a presser foot to clamp fabrics upon said table to be cut by said knife.

3. A cloth cutting mechanism, comprising a table, a cradle positioned on said table, a carrier ram carried by said cradle, said cradle having longitudinal bearings to guide said carrier ram and adjustable stop means to limit the movement of said ram, a U-shaped bracket carried at the front end of said ram, a vertically reciprocatory head carried by said bracket, a knife carried by said head and means on said head to reciprocate said knife.

4. A cloth cutting mechanism, comprising a table, a cradle positioned on said table, a carrier ram carried by said cradle, said cradle having longitudinal bearings to guide said carrier ram and adjustable stop means to limit the movement of said ram, a U-shaped bracket carried at the front end of said ram, a vertically reciprocating head carried by said bracket, said head carrying a reciprocatory knife haft, an eccentric for driving said haft, a vertical knife carried by said haft, and an electric motor for driving said eccentric.

5. A cloth cutting mechanism, comprising a table, a cradle positioned on said table, a carrier ram carried by said cradle, said cradle having longitudinal bearings to guide said carrier ram and adjustable stop means to limit the movement of said ram, a U-shaped bracket carried at the front end of said ram, a vertically reciprocatory head carried by said bracket, a knife carried by said head and means on said head to reciprocate said knife and means to latch said head in lowered position.

6. A cloth cutting mechanism, comprising a table, a cradle positioned on said table, a carrier ram carried by said cradle, said cradle having longitudinal bearings to guide said carrier ram and adjustable stop means to limit the movement of said ram, a U-shaped bracket carried at the front end of said ram, a vertically reciprocatory head carried by said bracket, a knife carried by said head and means on said head to reciprocate said knife, manual means to lower said head to cause said knife to contact the cloth to be cut and spring means to return said head after the cutting is completed.

7. A cloth cutting mechanism, comprising a table, a cradle positioned on said table, a carrier ram carried by said cradle, said cradle having longitudinal bearings to guide said carrier ram and adjustable stop means to limit the movement of said ram, a U-shaped bracket carried at the front end of said ram, a vertically reciprocatory head carried by said bracket, a knife carried by said head and means on said head to reciprocate said knife and means to clamp said carrier ram in fixed position during reciprocation of said head.

8. A cloth cutting mechanism, comprising a table, a cradle positioned on said table, a carrier ram carried by said cradle, said cradle having longitudinal bearings to guide said carrier ram and adjustable stop means to limit the movement of said ram, a U-shaped bracket carried at the front end of said ram, a vertically reciprocatory head carried by said bracket, a knife carried by said head and means on said head to reciprocate said knife, a pressure foot to hold the cloth to be cut upon said table and a pressure treadle to actuate said foot and latch it in position during the cutting operation.

9. A cloth cutting machine, comprising a vertical knife serving as a cutter, a knife haft carrying said knife, a head having a vertical bearing for said haft, a crank to reciprocate said haft, said head having a horizontal bearing for said crank, a motor carried by said head to drive said crank, a frame carrying said head having a rack and a pinion carried by said head meshing with said rack, a handle driving said pinion to lower said head and a return spring to elevate said head.

10. A cloth cutting machine, comprising a vertical knife serving as a cutter, a knife haft carrying said knife, a head having a vertical bearing for said haft, a crank to reciprocate said haft, said head having a horizontal bearing for said crank, a motor carried by said head to drive said crank, a frame carrying said head having a rack and a pinion carried by said head meshing with said rack, a handle driving said pinion to lower said head and a return spring to elevate said head, a carrier ram to carry said frame, and a base to support and afford slide bearings for said carrier ram.

11. A cloth cutting machine, comprising a vertical knife serving as a cutter, a knife haft carrying said knife, a head having a vertical bearing for said shaft, a crank to reciprocate said haft, said head having a horizontal bearing for said crank, a motor carried by said head to drive said crank, a frame carrying said head having a rack and a pinion carried by said head meshing with said rack, a handle driving said pinion to lower said head and a return spring to elevate said head, a carrier ram to carry said frame, and a base to support and afford slide bearings for said carrier ram, and means to hold said head and carrier ram in a desired position.

12. A cloth cutting mechanism comprising a support for the cloth to be cut, a clamp to hold the fabric down during cutting, a vertically and laterally reciprocable head member, a vertically disposed knife extending downwardly from said head and carried by said head and vertically and laterally reciprocable guide slide devices to guide and control the movement of said head, the vertically reciprocable guide slide device being carried on the end of the laterally reciprocable guide slide device.

13. A cloth cutting mechanism comprising a support for the cloth to be cut, a clamp to hold the fabric down during cutting, a vertically and laterally reciprocable head member, a vertically disposed knife extending downwardly from said head and carried by said head and vertically and laterally reciprocable guide slide devices to guide and control the movement of said head, the vertically reciprocable guide slide device being provided with a vertical rack and intermeshing pinion and a return coil spring device.

14. A cloth cutting mechanism comprising a support for the cloth to be cut, a clamp to hold the fabric down during cutting, a vertically and laterally reciprocable head member, a vertically disposed knife extending downwardly from said head and carried by said head and vertically and laterally reciprocable guide slide devices to guide and control the movement of said head, said guide slide devices being provided with a vertical rack and pinion to elevate and lower said knife.

MORRIS COWAN.

REFERENCES CITED

The following references are of record in the file of this patent:

UNITED STATES PATENTS

| Number | Name | Date |
| --- | --- | --- |
| 184,769 | Ferris | Nov. 28, 1876 |
| 341,700 | Stimpson | May 11, 1886 |
| 715,642 | Curtis | Dec. 9, 1902 |
| 840,702 | Maloney | Jan. 8, 1907 |
| 943,221 | Engberg | Dec. 14, 1909 |
| 1,183,674 | Rock et al. | May 16, 1916 |
| 1,585,012 | Biersdorf | May 18, 1926 |